(12) United States Patent
Park

(10) Patent No.: US 7,712,378 B2
(45) Date of Patent: May 11, 2010

(54) PRESSURE SENSITIVE DISPLACEMENT SENSOR

(76) Inventor: Seung Hyuk Park, 60-19 Jamwon-Dong, Seocho-ku, Seoul 137-030 (KR)

( * ) Notice: Subject to any disclaimer, the term of this patent is extended or adjusted under 35 U.S.C. 154(b) by 210 days.

(21) Appl. No.: 11/815,560

(22) PCT Filed: Jan. 31, 2006

(86) PCT No.: PCT/KR2006/000327
§ 371 (c)(1),
(2), (4) Date: Aug. 4, 2007

(87) PCT Pub. No.: WO2006/083095
PCT Pub. Date: Aug. 10, 2006

(65) Prior Publication Data
US 2008/0011045 A1  Jan. 17, 2008

(30) Foreign Application Priority Data
Feb. 5, 2005  (KR) .................. 10-2005-0010933

(51) Int. Cl.
*G01N 3/08* (2006.01)
(52) U.S. Cl. ........................................ 73/818
(58) Field of Classification Search ............... 73/818
See application file for complete search history.

(56) References Cited
U.S. PATENT DOCUMENTS
3,757,322 A * 9/1973 Barkan et al. ............... 345/174
(Continued)

*Primary Examiner*—Lisa M Caputo
*Assistant Examiner*—Octavia Davis

(74) *Attorney, Agent, or Firm*—Park & Associates IP Law LLC

(57) ABSTRACT

A pressure-sensitive displacement sensor comprises: (A) a contact portion (11) which includes: a semi-conductive matrix layer (14) containing conductive materials with a predetermined density, wherein the semi-conductive matrix layer is formed with a soft material having elasticity and has a resistance (Rx) under a normal condition without subjecting to a contact pressure, and when the semi-conductive layer is pressed, a density of the conductive materials in the semi-conductive matrix layer is increased due to compression of the soft semi-conductive layer, which results in reduction of the resistance (Rx); a first conductive layer (12) disposed on a first surface of the semi-conductive matrix layer; and a second conductive layer (13) disposed on a second surface of the semi-conductive matrix layer; (B) a first resistor (19) having one side connected to the first conductive layer and the other side connected to a power source; (C) a second resistor (21) having one side connected to the second conductive layer and the other side connected to ground; (D) a first voltage comparator (16) having a plus terminal and a minus terminal, the minus terminal connected to the first conductive layer; (E) a second voltage comparator (17) having a plus terminal and a minus terminal, the plus terminal connected to the second conductive layer; (F) a third resistor (22) having one side connected to the power source and the other side connected to the plus terminal of the first voltage comparator; (G) a fourth resistor (23) having one side connected to the plus terminal of the first voltage comparator and the other side connected to the minus terminal of the second voltage comparator; (H) a fifth resistor (24) having one side connected to ground and the other side connected to the minus terminal of the second voltage comparator; and (I) an OR-gate (18) connected to the outputs of the first and second voltage comparators and operable to output signals in response to the outputs of the first and second voltage comparators.

3 Claims, 15 Drawing Sheets

U.S. PATENT DOCUMENTS 3,781,855 A * 12/1973 Killen .......................... 382/126
4,347,505 A *  8/1982 Anderson .................... 340/666
4,555,954 A * 12/1985 Kim ...................... 73/862.046
4,764,717 A *  8/1988 Tucker et al. ................ 323/364
4,893,115 A *  1/1990 Blanchard ................... 345/174
5,488,204 A *  1/1996 Mead et al. ............... 178/18.06

* cited by examiner

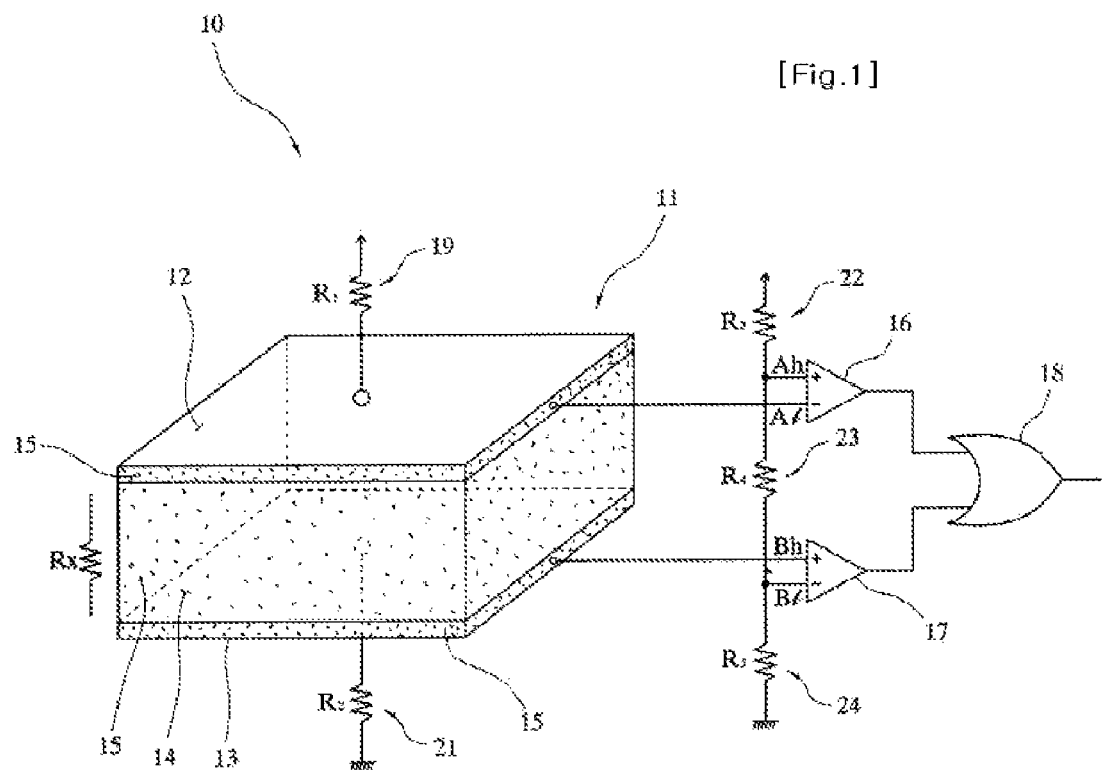
[Fig.1]
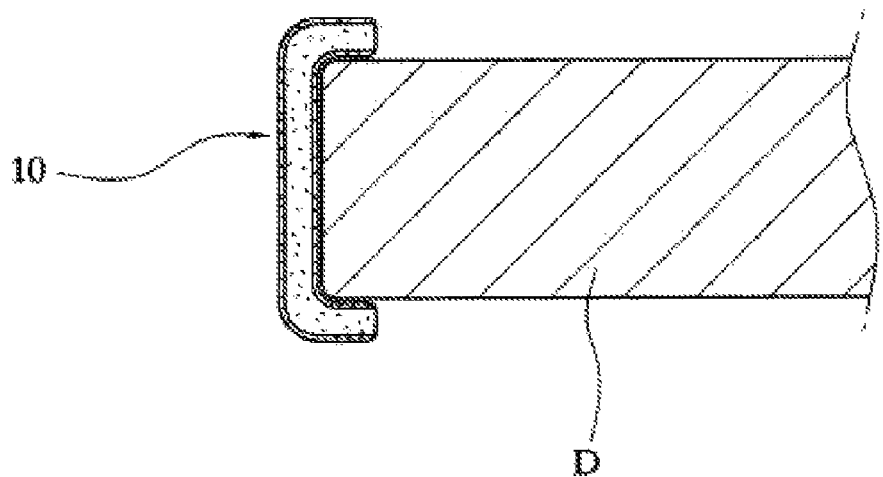
[Fig.2]

[Fig.3]
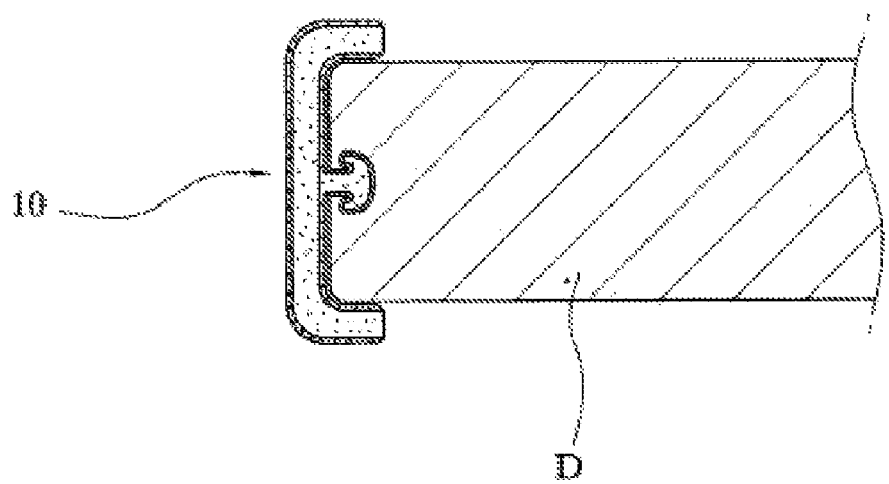
[Fig.4]
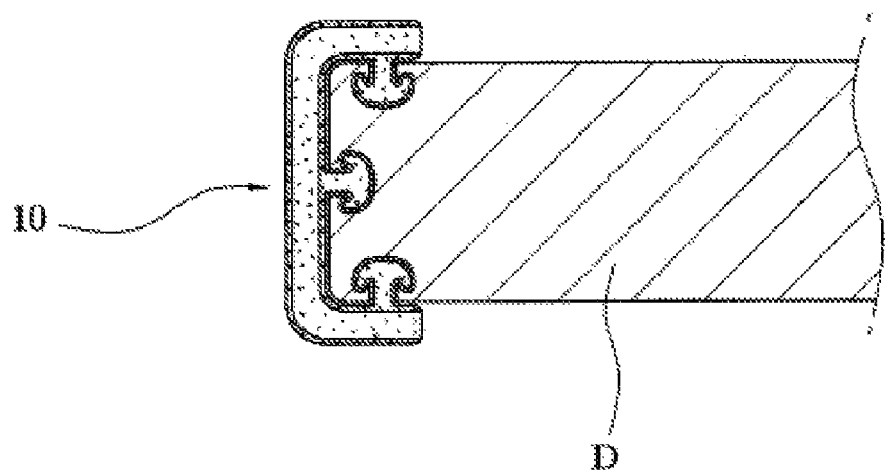

[Fig.5]
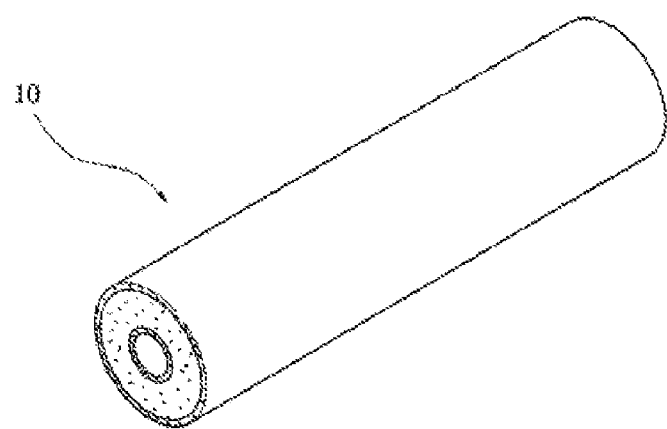
[Fig.6]
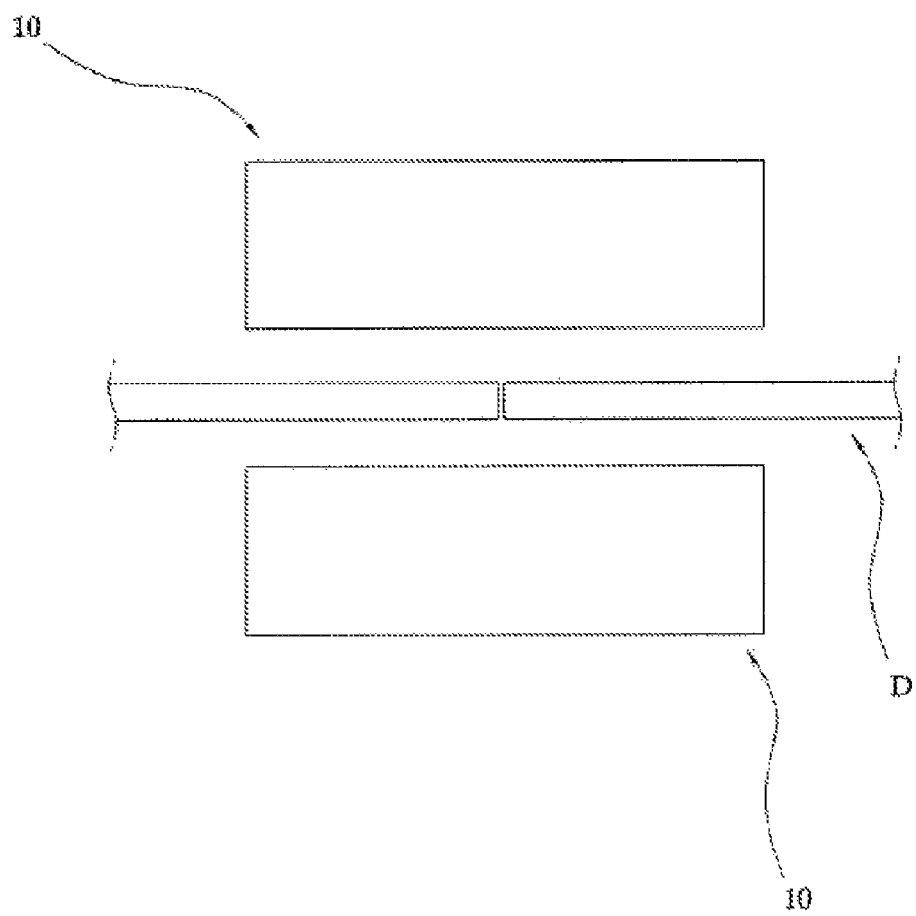

[Fig.7]
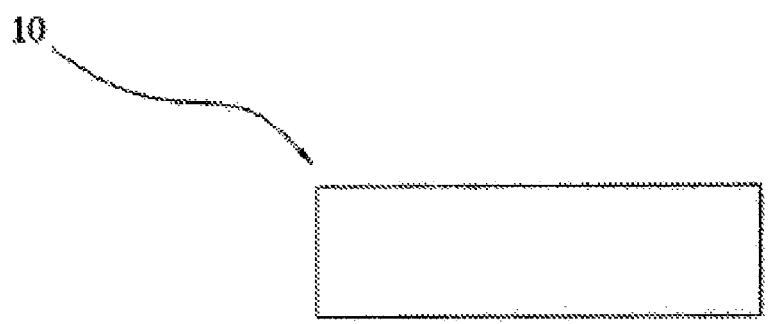
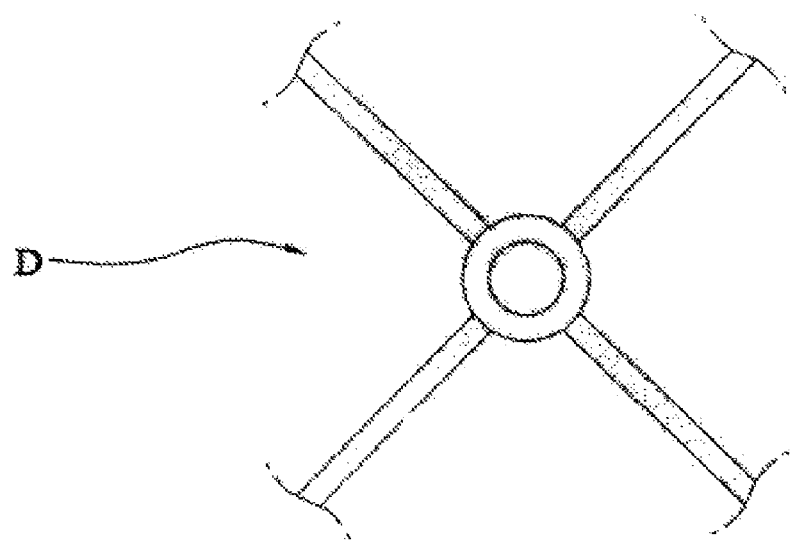
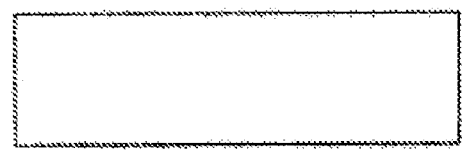

[Fig.8]
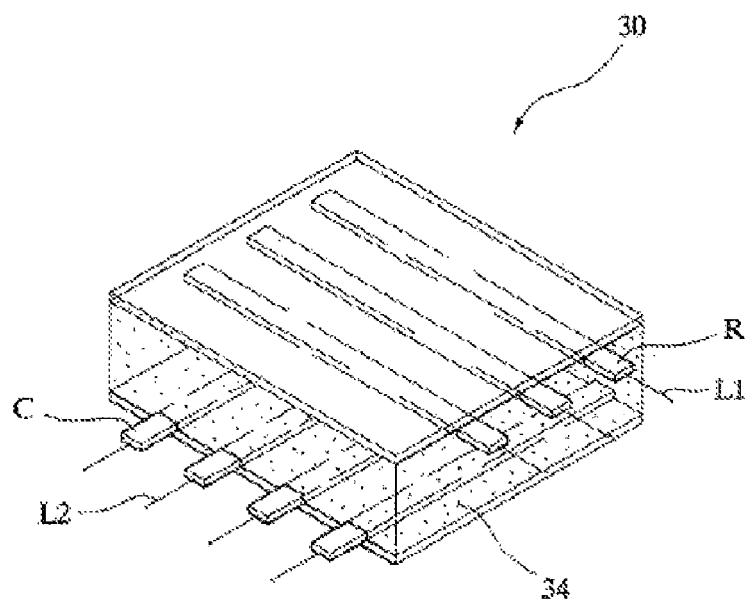
[Fig.9]
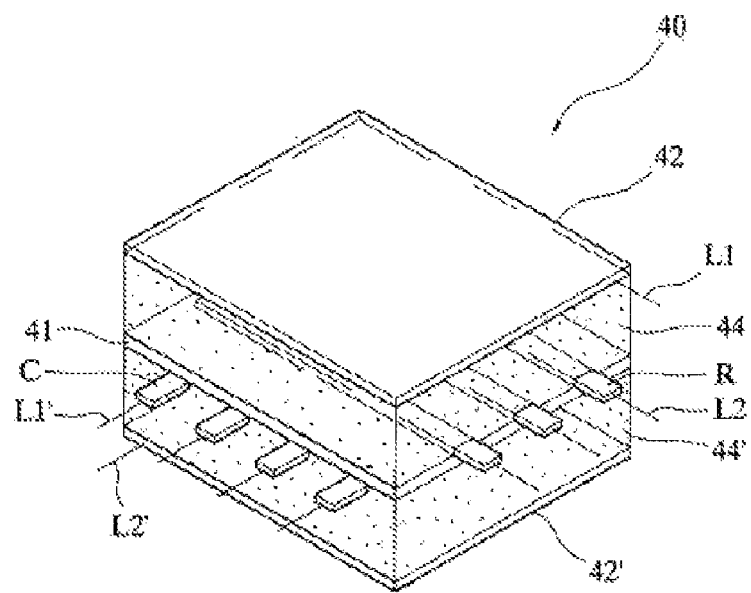

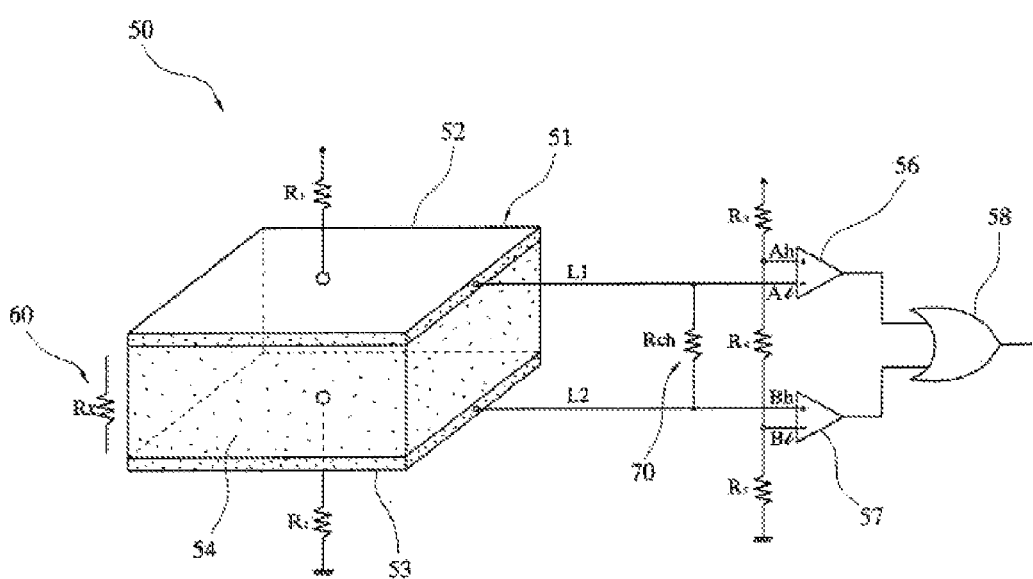
[Fig.10]

[Fig.11]
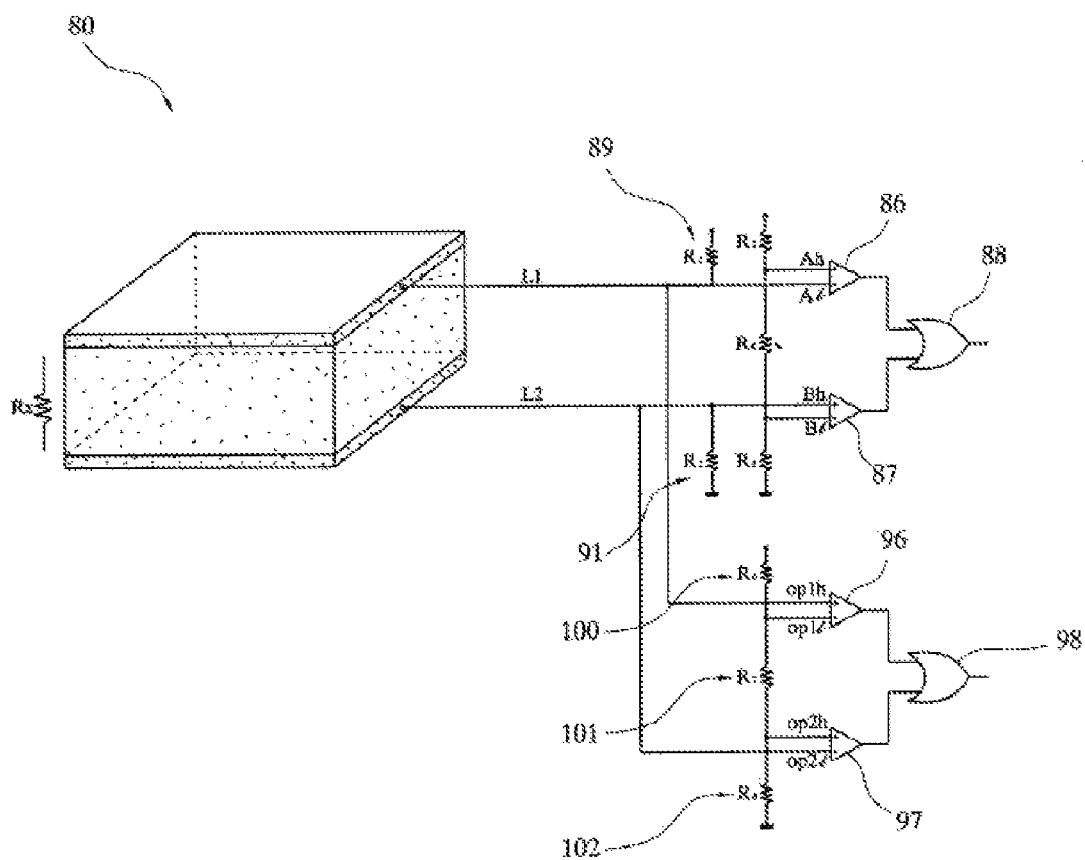

[Fig.12]
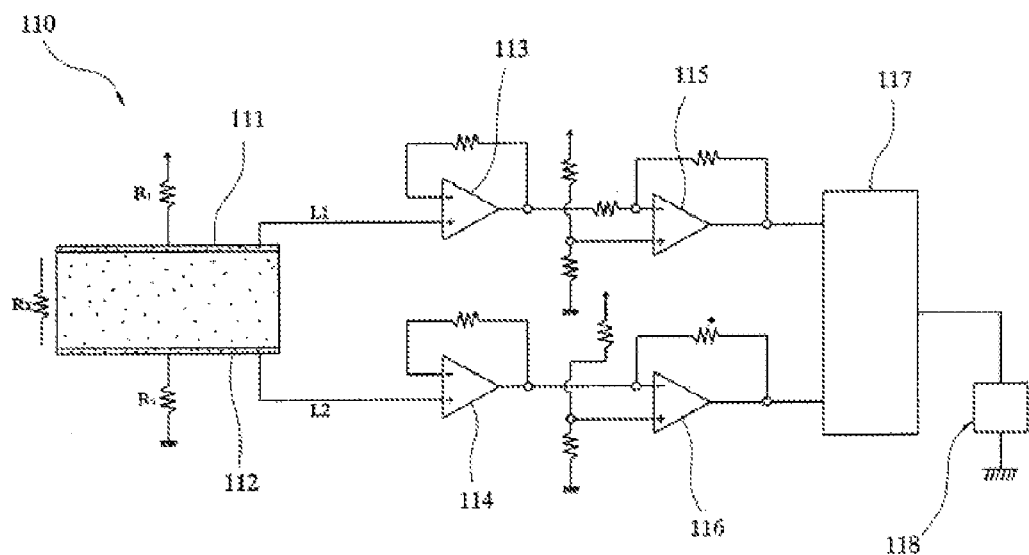
[Fig.13]
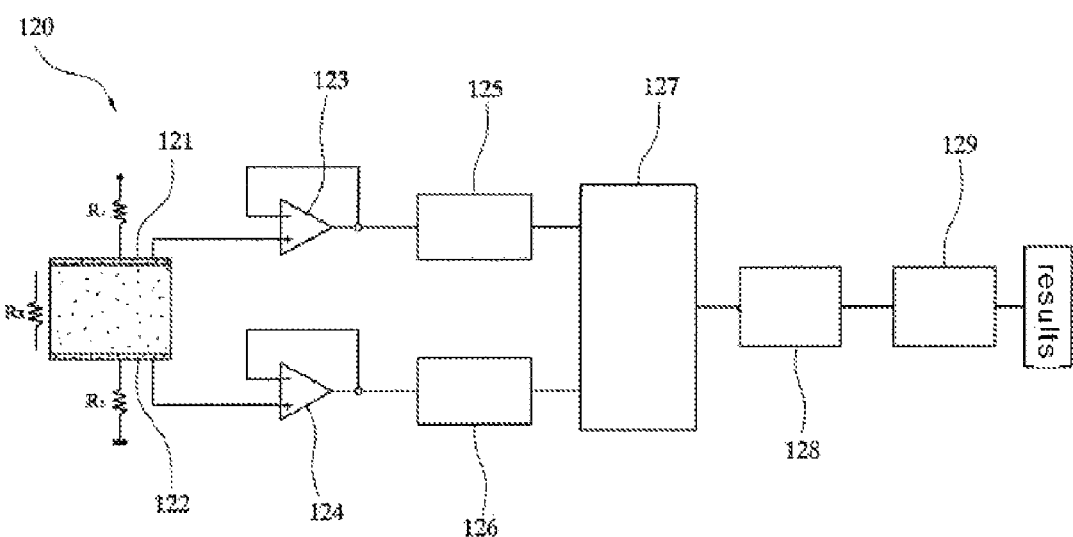

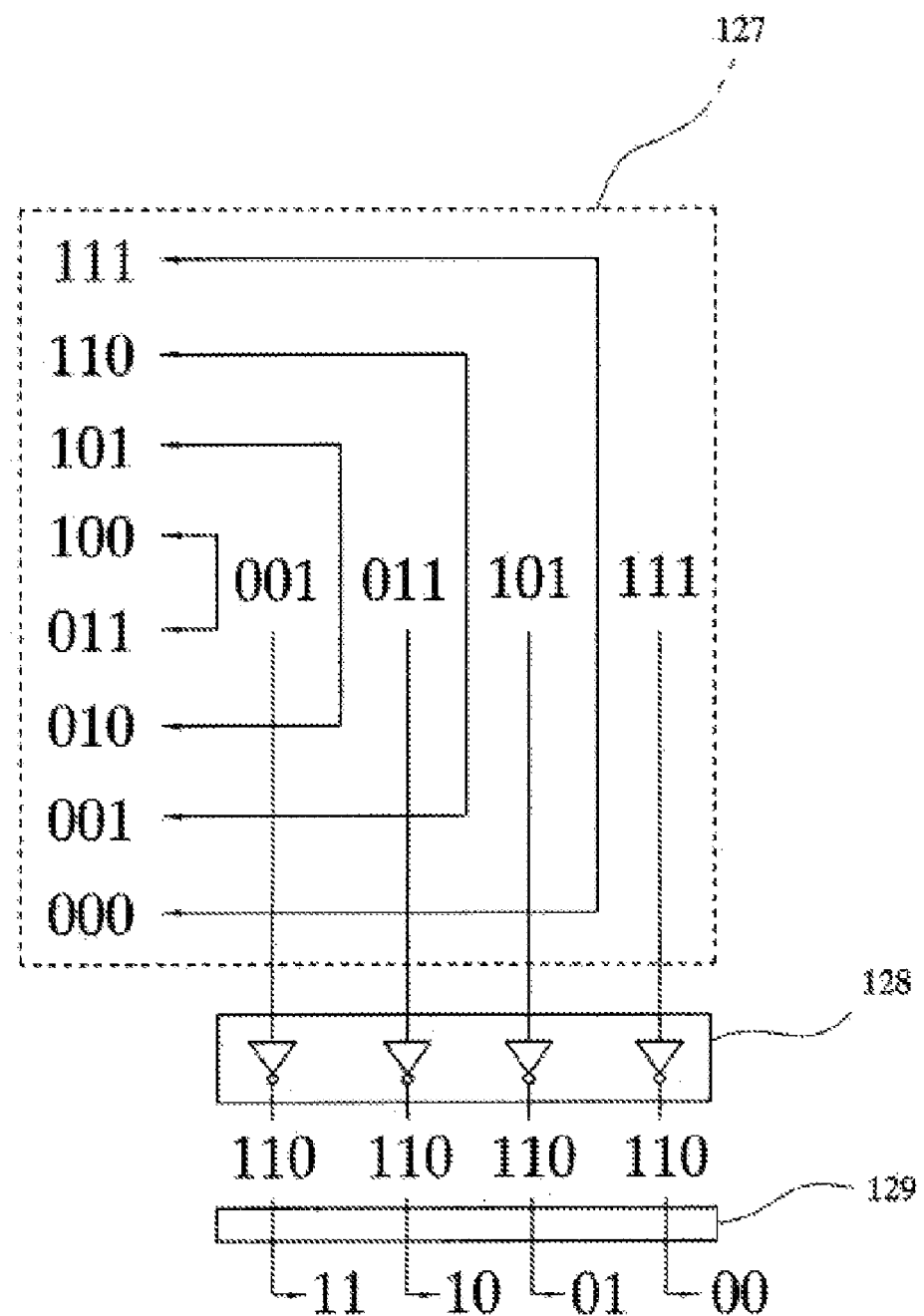
[Fig.14]

[Fig.15]
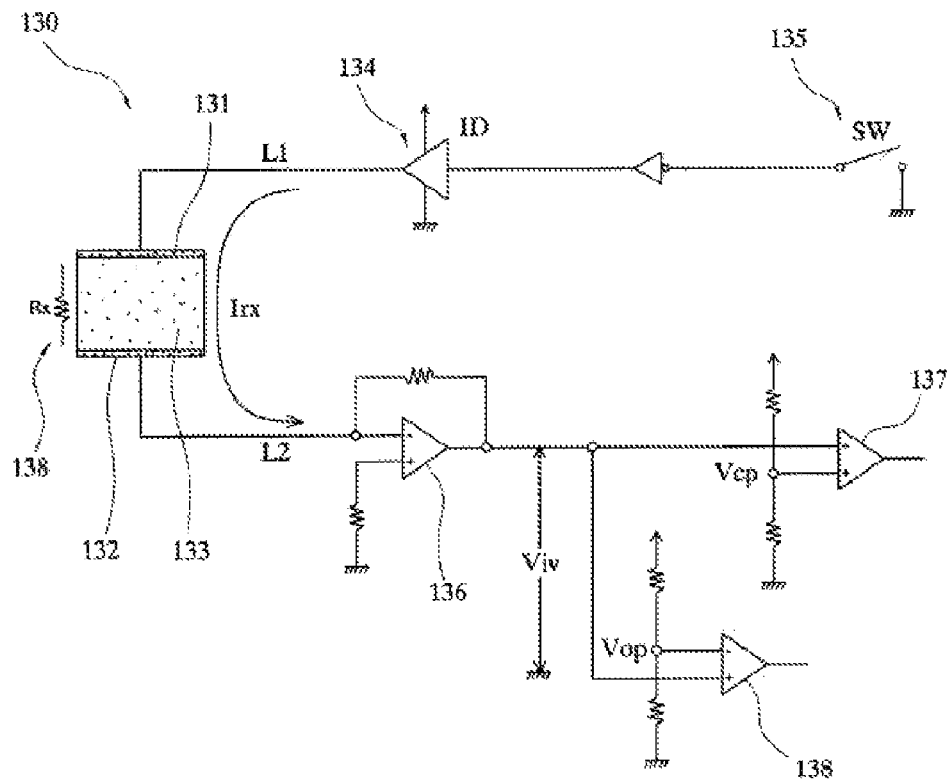
[Fig.16]
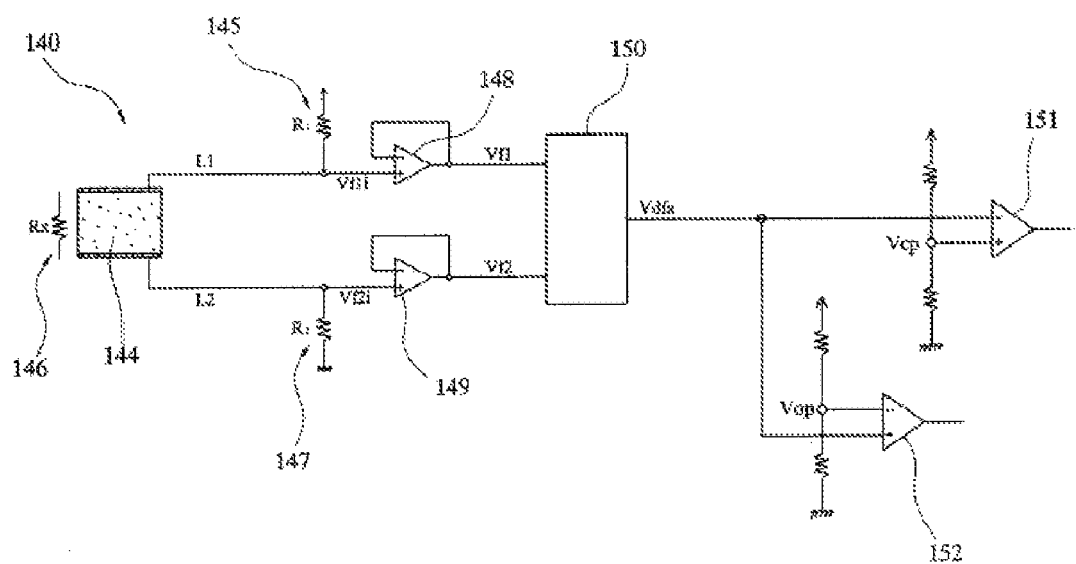

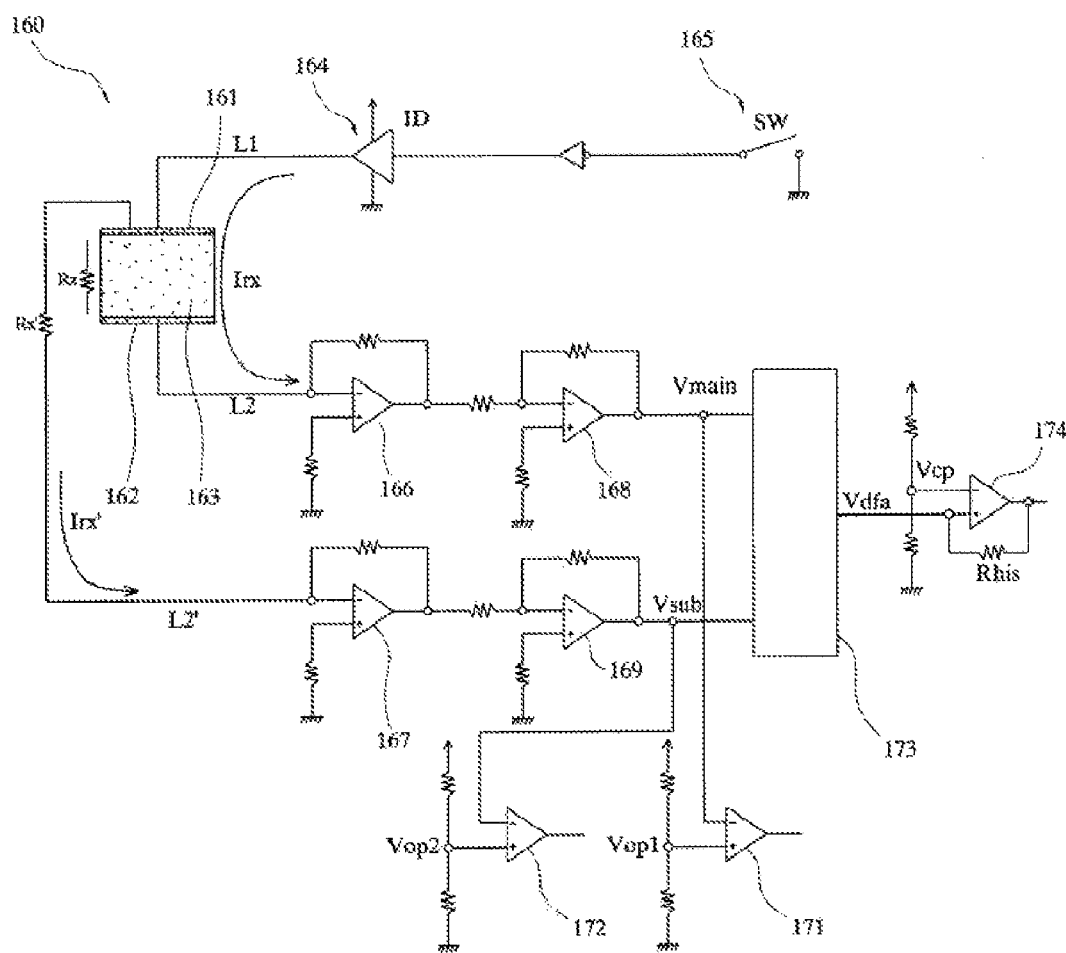
[Fig. 17]

[Fig. 18]
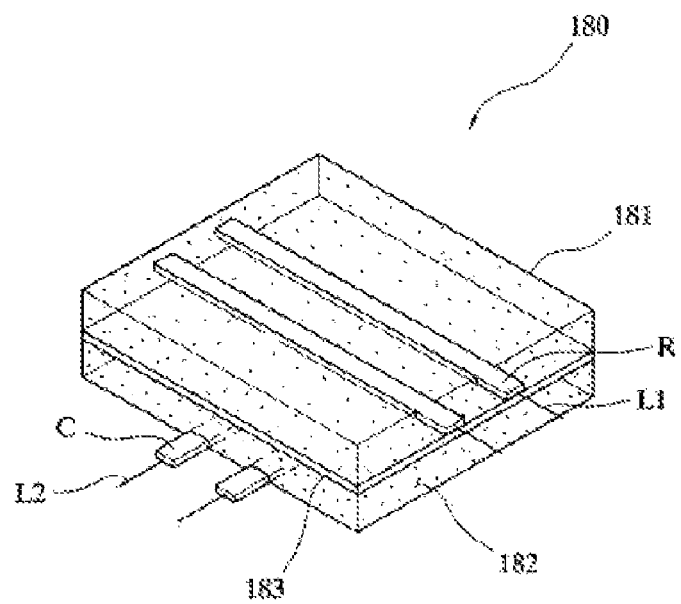
[Fig. 19]
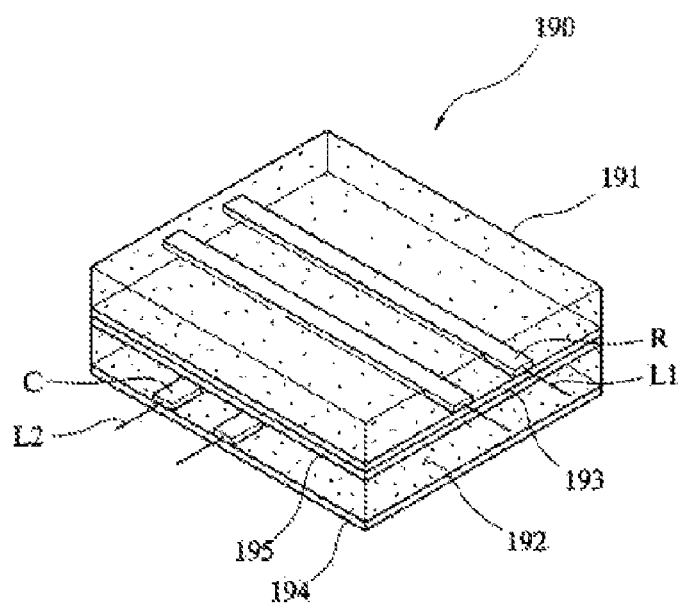

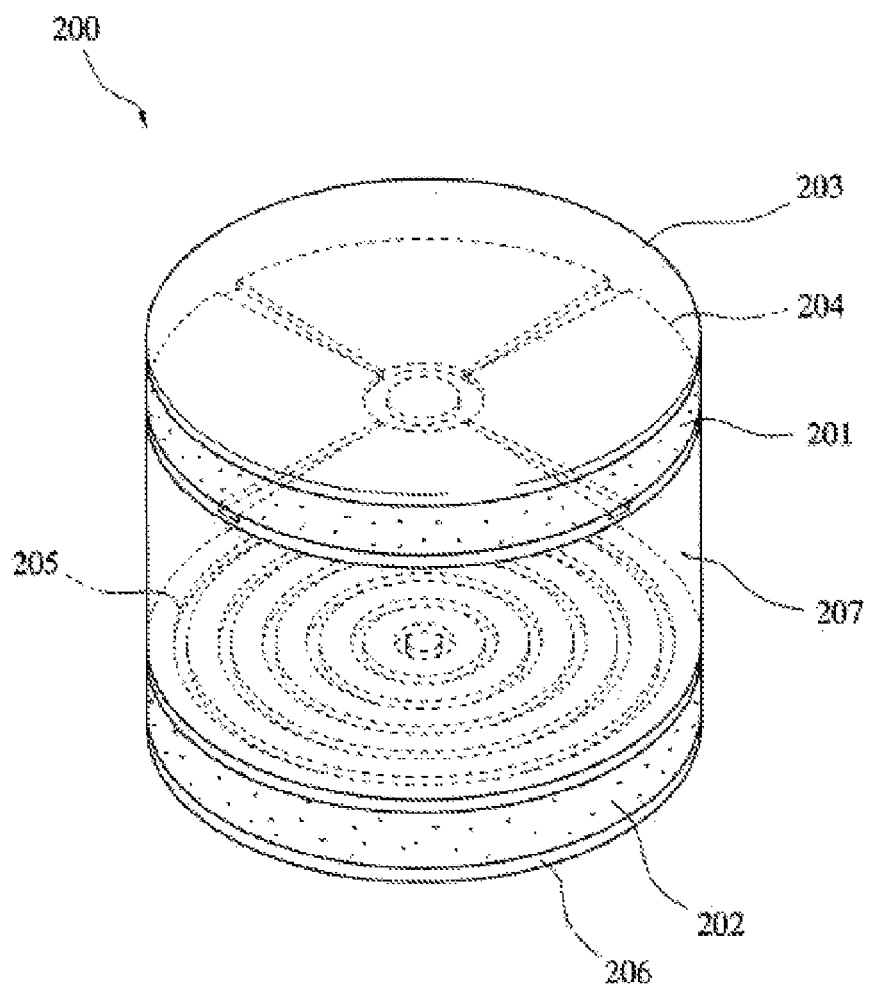

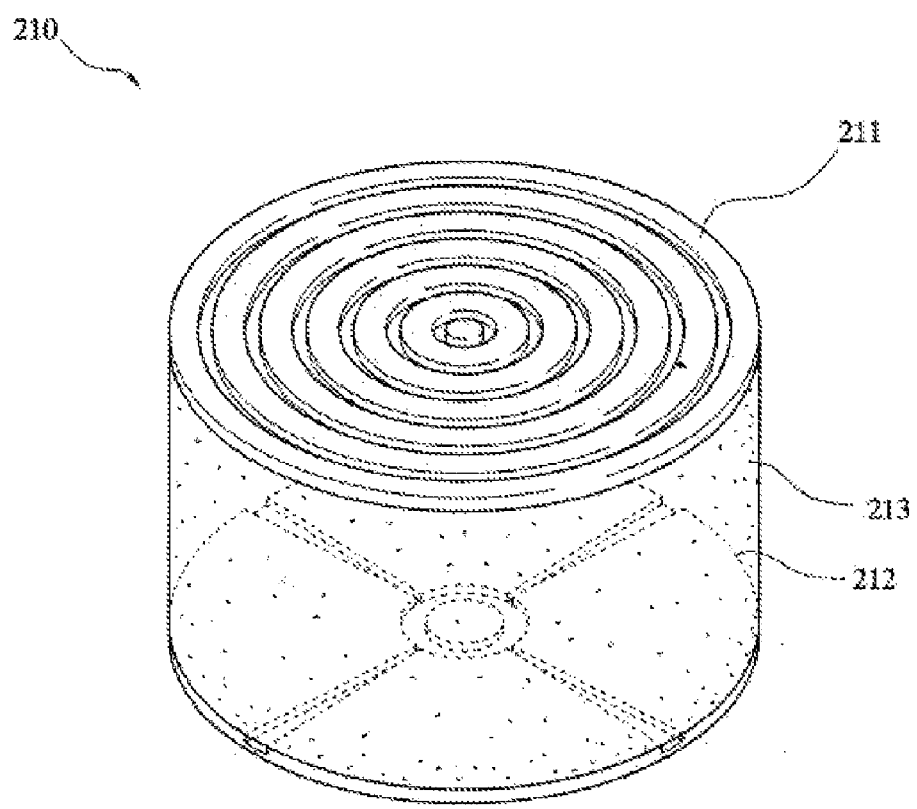
[Fig.21]

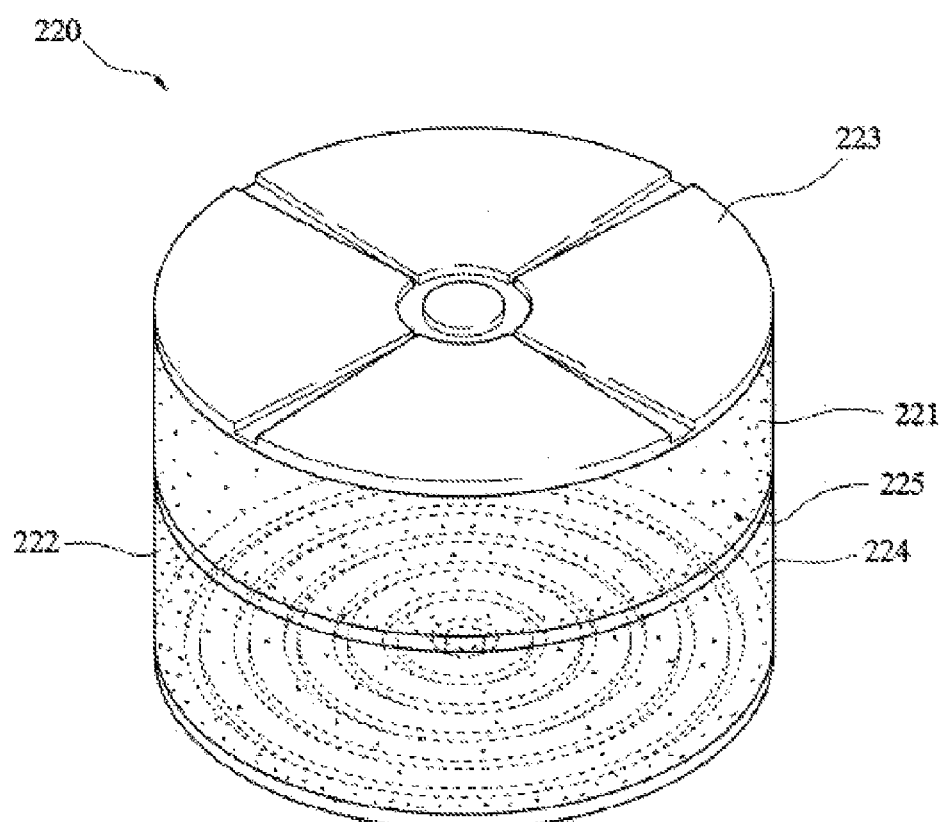
[Fig.22]

PRESSURE SENSITIVE DISPLACEMENT SENSOR

FIELD OF THE INVENTION

This invention relates to a sensor, more particularly to a pressure-sensitive displacement sensor.

BACKGROUND OF THE INVENTION

A sensor is a device that changes a physical quantity to another physical quantity in response to a physical stimulation.

There are typically two kinds of sensors;

Contacting sensor that perceives the existence of an object by contacting the object; and Non-contacting sensor that perceives the existence of an object without contacting the object.

The contacting sensor is used wider than the non-contacting sensor. For one example of the contacting sensors, a limit switch is often used in a place where the safety needs to be secured, for example, to protect from explosion, and it is not sensitive to an effect of magnetic field.

However, it was difficult to install a conventional contacting sensor to some part of the limited device that is narrower than the limit switch space.

Therefore, the conventional contacting sensors have limitations to install to the various featured devices.

SUMMARY OF THE INVENTION

In order to solve the problems mentioned above, the present invention provides a pressure-sensitive displacement sensor that can be made with various features and set up in the various devices.

In order to accomplish the purposes, the present invention of the pressure-sensitive displacement sensor has special characteristics and features as follows:

The pressure-sensitive displacement sensor contains electric conductive materials therein, and a semi-conductive matrix layer with electric resistance Rx;

A $1^{st}$ conductive layer including the electric conductive materials is disposed on the semi-conductive matrix layer;

A $2^{nd}$ conductive layer including the electric conductive materials is disposed on the bottom part of the semi-conductive matrix layer;

A $1^{st}$ resistor is connected to the $1^{st}$ conductive layer and to a power source;

A $2^{nd}$ resistor is connected to the $2^{nd}$ conductive layer;

A $1^{st}$ voltage comparator has its low part terminal ((−) terminal) connected to the $1^{st}$ conductive layer;

A 2nd voltage comparator has its high part terminal ((+) terminal) connected to the $2^{n}$ conductive layer;

A $3^{rd}$ resistor has a part connected to the power source, and the other part connected to the high part terminal ((+) terminal) of the $1^{st}$ voltage comparator;

A $4^{th}$ resistor has a part connected to the terminal (+) of the $1^{st}$ voltage comparator, and the other part connected to the terminal (−) of the $2^{nd}$ voltage comparator;

A $5^{th}$ resistor has a part connected to the ground, and the other part connected to the terminal (−) of the above the $2^{nd}$ voltage comparator; and An OR gate is connected to the $1^{st}$ voltage comparator and the $2^{nd}$ voltage comparator, and outputs a signal in response to the output of the $1^{st}$ and $2^{nd}$ voltage comparators.

Accordingly, because the synthetic resins contains the electric conductive materials, and is formed with gum or silicon materials having elasticity, for example, such as synthetic resins of soft properties, the push down contact is made when it is touched from the outside, as the thickness of the semi-conductive matrix layer is reduced and the density of the electric conductive material becomes increased. Therefore, it is possible to sense the push down contact as it is made of the soft materials.

Moreover, it is easy to be made into various shapes, and can be installed, for example, to an automatic revolving door, an automatic sliding door, a bumper of cars, the front, sides and the back of a streetcar, a pressure gauge, a weight gauge and any device or pipe that uses air, for example. Therefore, it would be effective for various fields such as measurement of air pressure or liquid pressure.

According to the present invention, because the contact part (11) contains electric conductive materials and is formed with an elastic material, for example, such as soft plastics, rubber, gum, or silicon, the push down contact is made from outside to the contact part (11), as the volume of the semi-conductive matrix layer (14) is reduced by touching, and the density of the electric conductive materials (15) of the semi-conductive matrix layer (14) becomes larger to sense the pressure. Moreover, as it is formed with soft materials, it can be made and installed in various shapes, for example, to the automatic revolving door (D), automatic sliding door (D), bumper of vehicles, front, back and sides of streetcars, and it can also be installed to the pressure gauge or weight gauge, and also to the machines that use gas or pipes to measure an air pressure or liquid pressure, for instance.

BRIEF DESCRIPTION OF THE DRAWINGS

FIG. 1 is a diagrammatic representation of the device and illustrating an electronic circuit of the pressure-sensitive displacement sensor according to one example of the present invention.

FIG. 2-FIG. 4 are enlarged, partial cross-sectional views showing application examples of the pressure-sensitive displacement sensor according to the present invention.

FIG. 5 is a perspective view showing another application example of the pressure-sensitive displacement sensor according to the present invention.

FIGS. 6 and 7 are illustrative diagrams showing other application examples of the pressure-sensitive displacement sensor according to the present invention.

FIGS. 8 and 9 are brief perspective diagrammatic representations illustrating other examples of the pressure-sensitive displacement sensor according to the present invention.

FIGS. 10 and 11 are diagrammatic representations showing the electronic circuits and wire connections between the sensor and the comparative electronic circuit part as examples of the pressure-sensitive displacement sensor according to the present invention.

FIG. 12 is a diagrammatic representation showing an electronic circuit configured to detect the degree of push down contact as an analogue result value as one example of the pressure-sensitive displacement sensor according to the present invention.

FIG. 13 is a diagrammatic representation showing an electronic circuit configured to detect the degree of push down contact as a digital result value as another example of the pressure-sensitive displacement sensor according to the present invention.

FIG. 14 is a diagrammatic representation illustrating the arithmetic operation according to the electronic circuit of FIG. 13.

FIG. 15 is a diagrammatic representation showing an electronic circuit and illustrating the way of detecting a push down contact and disconnection of the wire by the electronic circuit through detecting a current flow on the semi-conductive matrix layers according to one example of the pressure-sensitive displacement sensor of the present invention.

FIG. 16 is a diagrammatic representation showing an electronic circuit and illustrating the way for dissolving errors that were created from a noise by removing it and detecting the disconnection of the connecting wire according to another example of the pressure-sensitive displacement sensor of the present invention.

FIG. 17 is a diagrammatic representation showing an electronic circuit and illustrating a main circuit and a sub-circuit connected therewith to remove a noise, and applying the special characteristics of hysteresis on the settled push down contact degree according to another example of the pressure-sensitive displacement sensor of the present invention.

FIGS. 18-22 are perspective diagrammatic representations illustrating other examples of the pressure-sensitive displacement sensor of the present invention.

The explanation of the reference numbers of main parts shown in the drawings:
- 10; Pressure-sensitive displacement sensor
- 11; Contact part (or Contact portion)
- 12; $1^{st}$ conductive layer
- 13; $2^{nd}$ conductive layer
- 14; Semi-conductive (matrix) layer
- 15; Electric conductive materials
- 16; 1st voltage comparator
- 17; $2^{nd}$ voltage comparator
- 18: OR-Gate
- 19; $1^{st}$ resistor
- 21; $2^{nd}$ resistor
- 22; 3rd resistor
- 23; $4^{th}$ resistor
- 24; $5^{th}$ resistor

DETAILED DESCRIPTION OF THE INVENTION

The more specific characteristics and features of this invention will be clear by the explanation of the accompanying drawings as detailed below.

FIG. 1 is a brief diagrammatic representation of the pressure-sensitive displacement sensor including an electronic circuit constructed according to one embodiment of the invention, in which the sensor includes a touching or contact part (11), and the contact part (11) consists of semi-conductive (matrix) layer (14), the $1^{st}$ conductive layer (12), and the $2^{nd}$ conductive layer (13).

In another example using this invention, a main circuit and a sub-circuit can be provided to remove a noise that is input from outside, and it can be designed to extract the level of change of the conduction rate caused by pure push down contact.

Here, the semi-conductive (matrix) layer (14) can be made of sponge or other flexible materials such as gum, synthetic resins substance, synthetic rubber, urethane or silicon of foaming or not foaming properties.

The $1^{st}$ conductive layer (12) is formed of gum or flexible materials that has electric conduction properties, such as flexible or synthetic resins substance, synthetic rubber, urethane or silicon, and is disposed on the upper part of semi-conductive matrix layer (14).

The $2^{nd}$ conductive layer (13) is also formed of same materials with the $1^{st}$ conductive layer (12), and is disposed on the bottom surface of the semi-conductive matrix layer (14).

To the $1^{st}$ conductive layer (12), a first resistor (19) is coupled, with a part connected to the $1^{st}$ conductive layer (12), and with the other part connected to an electronic power source.

To the $2^{nd}$ conductive layer (13), a second resistor (21) is coupled, with a part connected to ground, and with the other part connected to the $2^{nd}$ conductive layer (13).

To the $1^{st}$ conductive layer (12) and the $2^{nd}$ conductive layer (13), the $1^{st}$ voltage comparator (16) and the $2^{nd}$ voltage comparator (17) are coupled, and in the $1^{st}$ voltage comparator (16), a low part terminal (−) is connected to the $1^{st}$ conductive layer (12), and in the $2^{nd}$ voltage comparator (17), the high part (+) terminal is connected to the $2^{nd}$ conductive layer (13) as shown in FIG. 1.

To the $1^{st}$ voltage comparator (16) and the $2^{nd}$ voltage comparator (17), a third resistor (22), a fourth resistor (23) and a fifth resistor (24) are connected.

Here, a part of the third resistor (22) is connected to the electric power source, and the other part is connected to the high part of the $1^{st}$ voltage comparator (16), namely, the (+) terminal.

In the fourth resistor (23), a first part is connected to the third resistor (22) and to the terminal (+) of the $1^{st}$ voltage comparator (16), and the other part is connected to the fifth resistor (24) (that will be explained later) and to the terminal (−), the low part, of $2^{nd}$ voltage comparator (17).

In the fifth resistor (24), a first part is connected to the ground, and the other part is connected to the terminal (−) of the $2^{nd}$ voltage comparator (17).

To the $1^{st}$ voltage comparator (16) and the $2^{nd}$ voltage comparator (17), an OR gate is coupled to produce a signal in response to the output of the $1^{st}$ voltage comparator (16) and the $2^{nd}$ voltage comparator (17).

According to the present invention of pressure-sensitive displacement sensor as described above, the displacement sensor (10) keeps the normal condition, and the resistance Rx of the semi-conductive matrix layer (14) is selected to be two times of that of the first resistor (19) (resistance R1) and the second resistor (21) (resistance R2), respectively, and thus, in a ratio of (R1:Rx:R2=1:2:1).

Thus, because the terminal (−) of the $1^{st}$ voltage comparator (16) is connected to the $1^{st}$ conductive layer (12) that is located on the ¾ of the resistance among R1, Rx, and R2, the input of Al of the $1^{st}$ voltage comparator (16) is ¾ Vcc. (Here, we call terminal (+) of the $1^{st}$ voltage comparator (16) as Ah, terminal (−) of the $1^{st}$ voltage comparator (16) as Al, terminal (+) of the $2^{nd}$ voltage comparator (17) as Bh, and terminal (−) of the $2^{n}$ voltage comparator (17) as Bl.)

In addition, because Bh of the $2^{nd}$ voltage comparator (17) is connected to the $2^{nd}$ conductive layer (13) that is located on the ¼ of the resistance among R1, Rx and R2, the input of Bh of the $2^{nd}$ voltage comparator (17) is ¼ Vcc.

In addition, as an example, when the same resistance is assigned to third resistor (22) R3, fourth resistor (23) R4, and the fifth resistor (24) R5, that are coupled to the $1^{st}$ voltage comparator (16) and the $2^{nd}$ voltage comparator (17), the input of Ah of the $1^{st}$ voltage comparator (16) that is connected between the third resistor (22) R3 and the fourth resistor (23) R4 is ⅔ Vcc. In addition, the input of Bl of the $2^{n}$ voltage comparator (17) that is connected to the fifth resistor (24) $R_s$ is ⅓ Vcc.

Thus, the input of Ah of the 1st voltage comparator (16) is ⅔ Vcc, and the input of Al becomes ¾Vcc, and as a result, the input of Al becomes larger than the input of Ah. Thus, the output of the $1^{st}$ voltage comparator (16) becomes low. And the input of Bh of the $2^{nd}$ voltage comparator (17) is l/4Vcc, and the input of Bl becomes ⅓ Vcc, and as a result, the input of Bl becomes larger than the input of Bh. Thus, the output of the $2^n$ voltage comparator (17) becomes low.

Therefore, the outputs of both the $1^{st}$ voltage comparator (16) and the $2^{nd}$ voltage comparator (17) becomes low, the output of OR gate (18) whose output is decided according to the outputs of the 1st voltage comparator (16) and the $2^{nd}$ voltage comparator (17) becomes low in other word "0", and the pressure-sensitive displacement sensor maintains the normal condition.

When an external shock or contact is made to the pressure-sensitive displacement sensor (10), the semi-conductive matrix layer (14) is pressed by the external power, and the density of the electric conduction material that is included in the semi-conductive matrix layer becomes large, and the electric conduction rate becomes high, and the resistance of semi-conductive matrix layer (14) closes to zero ("0")

If the resistance of the semi-conductive matrix layer (14) becomes close to zero, the input of Al of the $1^{st}$ voltage comparator (16) that is connected to the $1^{st}$ conductive layer (12) and the input of Bh of the $2^{nd}$ voltage comparator (17) that is connected to the $2^{nd}$ conductive layer (13) closes to ½Vcc.

Thus, the input of Al, whose first established value was ¾Vcc, becomes less than ⅔ Vcc, which is the threshold value of Ah, and the values of Al and Ah are reversed, and the input of Ah becomes greater than the input of Al, as a result, the output of the $1^{st}$ voltage comparator (16) becomes high.

In addition, the input value of Bh, whose first established value was ¼Vcc, becomes larger than the threshold input of Bl, namely, more than ⅓ Vcc, and the values of Bl and Bh are reversed, and the input of Bh becomes larger than the input of Bl, as a result, the output of the $2^{nd}$ voltage comparator (17) becomes high.

Therefore, the outputs of the $1^{st}$ voltage comparator (16) and the $2^{nd}$ voltage comparator (17) becomes high, so the output of OR gate (18) becomes high, and the pressure of sensor (10) is detected.

According to the present invention, in order to increase the sensitivity in the detection of the displacement, the resistance value of the third resistor (22) R3, the fourth resistor (23) R4, the fifth resistor (24) R5 can be modified to make the level difference between Ah and Al of the 1st voltage comparator (16) or between Bh and Bl of the $2^{nd}$ voltage comparator (17) small, respectively.

In this invention, the pressure-sensitive displacement sensor includes the electric conduction materials or anti-semi electric conduction materials added to the base materials that has an elasticity, and with the elastic semi-conductive materials disposed between two electric conductive layers, which have the functions of electrodes, the external contact, even by small outside pressure, causes the reduction of the electric resistance in the elastic semi-conductive material, and is detected in a manner as described above.

Moreover, if either one of the 1st voltage comparator (16) part or the $2^{nd}$ voltage comparator (17) part works, OR gate (18) will work, and thus, the reliability of the sensor (10) is improved.

In addition, the sensor of the present invention can easily be installed to various devices, for example, to the sides and around the edges of the floor of the automatic revolving door (D) or automatic sliding door (D), in various ways of attachment, such as shown in FIG. 2 or FIG. 4. For example, if a hand or foot is between the edge of the automatic revolving door (D) and the wall, or the floor edge and floor of the automatic revolving door (D), the sensor (10) will be pressed, and by the sensor (10), the automatic revolving door will be stopped.

Moreover, if a man's hand or foot is put between doors of the automatic sliding door (D), the sensor (10) will be pressed and sensed, the automatic sliding door (D) will be reopen. And, in order to control the driving part of a street car, power connection, it can be installed on the front or back of the bumper of a toy car or real car, on the front, back or side of a streetcar, so it can be installed between cars, car and obstruction, accidents between car and human, cars, between street cars, street car and obstruction, street car and human in order to make its brake work to stop the cars or street cars.

Also, because the material of sensor (10) is formed of soft materials, sponge, urethane, silicon or gum that has elasticity, it can be easily made, it can be easily installed, and it can reduce the outside shock.

We can cover an insulator or a protecting screen on the whole sensor (10) that is exposed to outside to protect sensor (10) from dust, humidity, and heat.

Moreover, it can be installed on the crossroad ground to measure the traffic volume to perform a transport management such as a signal system change, modifying data, and it can be installed on the ground or with a part of the sensor (10) stood out on the parking area to lead cars to park on the right way, and it can be used for a parking control system.

Also, it can be installed at the driving test place to see if the test car is outside or inside of the driving course.

According to one embodiment of the present invention, the shape of pressure-sensitive displacement sensor (10) can be made to a circular cylinder shape as shown in FIG. 5, and it can be installed to be covered around a gas pipe to make the sensor pressed and sensed to ring a bell to protect from the invader when a thief or an unlawful invader climbs through the gas pipe of the building.

According to another embodiment of the present invention, the pressure-sensitive displacement sensor can be installed in a manner as shown in FIG. 6 on the floor of the automatic sliding door (D), or as shown in FIG. 7 on the floor of automatic revolving door (D) as a stepping-stone.

Thus, if a person steps on the sensor (10) on the stepping-stone of the automatic sliding door or revolving door, the sensor (10) will be pressed to sense the presence of a person, and the automatic sliding door is operated to open, and the automatic revolving door is operated to rotate.

As it is explained above, it can be installed in front of the elevator door, so when there is someone in front of the elevator door, the door is operated to open, and after the passenger enters the door, the door is closed.

FIG. 8 is a brief perspective view showing a different example of pressure-sensitive displacement sensor, and in the upper part of the semi-conductive matrix layer (34) a plurality of parallel conductive elements (R) are disposed with equal spacing, and in the bottom of semi-conductive matrix layer (34), a plurality of parallel conductive elements (C) are disposed with equal spacing and in crossed direction to the horizontally disposed conductive elements (R).

It connects the horizontal conductive elements (R) Rm to the connection L1n that is connected to the electric circuit, and connects the vertical conductive elements (C) Cn to the connection L2n that is connected to the electric circuit, and detects one push down contact, and as the points of contact by compounding the numbers of the horizontal and vertical conductive elements (R) and (C). Thus, in the example shown in the Figure, 3 horizontal conductive elements (R) and 4 vertical conductive elements (C) makes 12 points of contact (i.e., 3×4=12), and one of the 12 points are pressed, the particular point is sensed.

Thus, the sensor (30) as described above can be installed to a monitor to be used as a touch screen, or to a keyboard.

FIG. 9 is a brief perspective view showing a different example of pressure-sensitive displacement sensor, in which a dielectric layer (41) is disposed in the middle, and in the upper part of the dielectric layer, horizontal conductive elements (R) are disposed, and in the bottom part of the dielectric layer, the vertical conductive elements (C) are disposed.

In addition, in the upper part of the horizontal conductive elements (R), the first semi-conductive matrix layer (44) is disposed, and in the upper part of the $1^{st}$ semi-conductive matrix layer (44) the $1^{st}$ conductive layer (42) is disposed. In the bottom part of the vertical conductive elements (C), the $2^{nd}$ semi-conductive matrix layer (44), and in the bottom of the $2^{nd}$ semi-conductive matrix layer (44), the 2nd conduction (42) are respectively disposed, and in the $1^{st}$ conductive layer (42), the horizontal conductive elements (R), the $2^{nd}$ conductive layer (42), a perpendicular electric conductive elements (C), there are connection lines that are connected to the electric circuit.

It means that the $1^{st}$ conductive layer (42) is connected to connection line L1, one of the horizontal conductive elements is connected to connection line L2, and detects the push down contact in the horizontal conductive elements (R).

On the other hand, one of the $2^{nd}$ conductive layer (42) is connected to the connection line L1' and connects one of the perpendicular electric conductors to the connection L2', and detects the push down contact of the perpendicular electric conductor (C).

Thus, it is sensed the position of push down contact by the combination of push down contact (m, n); m push down contacts of the horizontal conductive elements (R) and n push down contact positions.

FIG. 10 is a brief diagrammatic representation showing a different example of pressure-sensitive displacement sensor, in that the disconnection between the end part and comparison electric circuit part is sensed, and the disconnection check resistor (70) that is connected to Al, the terminal (−) of the $1^{st}$ voltage comparator (56), and Bh, the terminal (+) of the $2^{nd}$ voltage comparator (57).

It means that when it is configured to make the Rch, disconnection check resistor (70), larger than Rx, the resistance of the semi-conductive matrix layer (54), because in the normal condition, the input of Ah of the $1^{st}$ voltage comparator (56) is smaller than the input of Al, the $1^{st}$ voltage comparator (56) is low, and because the input of Bh is smaller than the input of Bl, the $2^{nd}$ voltage comparator (57) is low, the output of OR gate (58) becomes low, in other word "0", the pressure-sensitive displacement sensor is in normal condition.

In this kind of condition, when the L1 is disconnected, the inputs of Al of the 1st voltage comparator (56) and of Bh of the $2^{n}$ voltage comparator (57) are almost in the same level, the input of Ah of the $1^{st}$ voltage comparator (56) becomes to have a larger value than the input of Al, the output of the $1^{st}$ voltage comparator (56) becomes high, and thus, the output of OR gate (58) becomes high, and it can notice the disconnection.

When the L2 is disconnected, the inputs of Bh of the $2^{nd}$ voltage comparator (57) and Al of the 1st voltage comparator almost becomes the same level, the input of Bh of the $2^{nd}$ voltage comparator becomes to have a larger value than the input of Bl, the output of the $2^{nd}$ voltage comparator (57) becomes high, and thus, the output of OR gate (58) becomes high and it can sense the disconnection.

And, if both L1 and L2 are disconnected, the inputs of Al of the $1^{st}$ voltage comparator (56) and of Bh of the $2^{nd}$ voltage comparator (57) becomes to be close to ½Vcc by the internal resistance of the $1^{st}$ voltage comparator (56) and the $2^{nd}$ voltage comparator (57).

Thus, the input of Ah of the $1^{st}$ voltage comparator (56) becomes larger than the input of Al, and the input of Bh of the $2^{nd}$ voltage comparator (57) becomes larger than the input of Bl, both the outputs of the $1^{st}$ voltage comparator (56) and the $2^{nd}$ voltage comparator (57) becomes high, and thus, the output of OR gate (58) becomes high and it can notice the disconnection.

Thus, because the disconnection check resistor (70) that is connected to Al of the $1^{st}$ voltage comparator (56) and Bhh of the $2^{nd}$ voltage comparator (57) is additionally provided, when one or both of the L1 or L2, which connect the $1^{st}$ conductive layer (52) and the $2^{nd}$ conductive layer (53) of the contact part (51) and the $1^{st}$ voltage comparator (56) and the $1^{st}$ voltage comparator (57), is disconnected, it can sense the disconnection.

FIG. 11 is a brief diagrammatic representation showing another different example of pressure-sensitive displacement sensor, in that the disconnection between the end part and comparison electric circuit part is noticed, and the $3^{rd}$ voltage comparator (96) is installed to connect OP1h, terminal (+), to the $1^{st}$ resistance (89) of the sensor (80), and the $4^{th}$ voltage comparator (97) is installed to connect Op2l, terminal (−) to the $2^{nd}$ resistance (91). And the $6^{th}$ resistor (100) a part is connected to electric circuit, and the other part is connected to OP1l, terminal (−) of the $3^{rd}$ voltage comparator (96), and the $7^{th}$ resistor (101) that a part is connected to the terminal (−) of the above the $3^{rd}$ voltage comparator (96), and the other part is connected to OP2h, terminal (+) of the $4^{th}$ voltage comparator (97) is installed, and the $8^{th}$ resistor (102) that a part is connected to ground and the other part is connected to OP2h, terminal (+) of the $4^{th}$ voltage comparator (97).

The 2nd OR gate (98) is installed at a part of the 3rd voltage comparator (96) and the 4th voltage comparator (97).

It means that the input of OP h of the $3^{rd}$ voltage comparator (96) is ¾ Vcc, which is same as the input of Al of the $1^{st}$ voltage comparator (86), and the input of OP l of the $4^{th}$ voltage comparator is ¼Vcc, which is same with Bh of the $2^{nd}$ voltage comparator (87).

And the resistance value of R, the $6^{th}$ resistor (100), R, the $7^{th}$ resistor (101), the $8^{th}$ resistor, can be installed differently. For example, if we install the ratio of the resistance values as R6:R7:R8=1:3:1, the input of OP l of the $3^{rd}$ voltage comparator (96) will be ⅘ Vcc, and the input of OP h of the $4^{th}$ voltage comparator (97) becomes ⅕ Vcc.

Thus, because in the normal condition, the input of OP h of the $3^{rd}$ voltage comparator (96), the output of the $3^{rd}$ voltage comparator (96) becomes low, and because the input of OP h of the $4^{th}$ voltage comparator (97) is smaller than the input of OP l, the output of the $4^{th}$ voltage comparator (97) becomes low.

With this kind of condition, when L1 is disconnected, the OP h of the $3^{rd}$ voltage comparator (96) is connected with the $1^{st}$ resistor (89) and delivered, the input value of the OP1h becomes 1 Vcc, and it has the value where the input value of the OP1h is bigger than the input value of the OP1l of the $3^{rd}$ voltage comparator (96), the output of the $3^{rd}$ voltage comparator (96) becomes high (High).

When L2 is disconnected, the OP2l of the $4^{th}$ voltage comparator (97) is connected with the $2^{nd}$ resistor (91) and the value of the OP l becomes "0", and the input of the OP2h is bigger than the input of OP2l, and the output of the $4^{th}$ voltage comparator (97) becomes high (High).

In this manner, if both L1 and L2 are disconnected, the outputs of both the $3^{rd}$ voltage comparator (96) and the $4^{th}$ voltage comparator (97) become high, and by the $3^{rd}$ voltage comparator (96) and the $4^{th}$ voltage comparator (97) the $2^{nd}$ OR gates (98) senses the disconnection of L1 and L2.

Consequently, by installing the $3^{rd}$ voltage comparator (96), the $4^{th}$ voltage comparator (97), $6^{th}$ resistor (100), $7^{th}$ resistor (101) and the $8^{th}$ resistor (102) to the sensor (80), the disconnection of the connection lines is immediately identified, and immediately after the connection line of the sensor (80) is disconnected, the sensor (80) can be repaired or replaced.

FIG. 12 is a circuit block diagram showing another example of the pressure-sensitive displacement sensor, and it is a brief circuit diagram that is configured to obtain an analog result value.

As can be seen from FIG. 12, the 1st voltage follower that the non-reversal input department (+) is connected to the $1^{st}$ conductive layer (111) is provided, and the $2^{nd}$ voltage follower (114) that the non-reversal input department (+) is connected to the $2^{nd}$ conductive layer (112) is provided.

And the 1st phase turner (115) that the 1st voltage follower is connected to the reversal input department (−), and the $2^{nd}$ phase turner (116) that the $2^{nd}$ voltage follower is connected to the reversal input department is provided.

In a part of the $1^{st}$ phase turner (115) and $2^{nd}$ phase turners (116) the differential amplifier (117) which is connected with these is provided, and to the other side of the differential amplifiers (117), the load system that is connected to the differential amplifier (117) and that shows the quantity of the electric power and pressure visually is provided. We can use load system (118) motor, and the luminous lamp.

The pressure-sensitive displacement sensor (110), when the sensor (11) is pressed by the outside power, the output is made as the $1^{st}$ voltage follower (113) and the 2nd voltage follower (114) makes the electric power large to make the impedance low to fit into the next input impedance.

And it inputs two signals through the $1^{st}$ voltage follower (113) and the $2^{nd}$ voltage follower (114) to the 1st phase turner (115) and the 2nd phase turner (116) when the sensor (110) works, and phase shift and makes the difference between two signals that leads to a neutral point larger. The two signals that phase shifted is input to the differential amplifier (117), and the differential amplifier (117) amplifies to the signals that are matched with the voltage level of load system (118) and impedance.

When the signals amplified through the differential amplifier (117) is delivered to the load system (118), the operational degree of load system (118) is changed according to the delivered signals, and we can discern with eyes the level of pressure of sensor (110) through the load system (118).

Thus, the $1^{st}$ voltage follower, the $2^{nd}$ voltage follower (114), the $1^{st}$ phase turner (115) and the $2^{nd}$ phase turner (116), differential amplifier (117), and the load system (118) are connected and provided, the sensor (110) can be installed to the analogue type of machine such as pressure gauge or weight gauge, or various gauge, and it can measure the level of the pressure or weight by looking at the level of the pressure of the sensor (110). Here, when the sensor is used for the weight gauge, not the soft but hard materials can be used for the $1^{st}$ conductive layer (111) and the $2^{nd}$ conductive layer (112).

Also, it can be installed to the machines that use gas such as a dishwasher to measure of the pressure of the gas, and to the pipe to measure of the liquid pressure of the inside of pipe. The FIG. 13 is a brief circuit diagram showing another example of using this invention, a pressure-sensitive displacement sensor, and that is configured to get the level of push down contact of the sensor as a digital result.

As can be seen from the FIG. 13, the $1^{st}$ A/D converter (125) is connected to the $1^{st}$ voltage follower (123) that is connected to the $1^{st}$ conductive layer (121), and the $2^{nd}$ A/D converter (124) that is connected to the $2^{nd}$ conductive layer (122) is connected and provided. And the subtracter (127) is connected the inverter (128) is connected and provided to the subtractor, and the shift register (129) is connected and provided to the inverter (128).

Even in the pressure-sensitive displacement sensor (120), the sensor (120) is pressed, the pressure level of the sensor (120) is digitalized, we can obtain same numbers as seen from the FIG. 14, if the sensor is pressed, it makes be the output impedance enough low as the $1^{st}$ voltage follower (123) and the second voltage follower (124), in other word, to make the electric quantity large, and transfers the output signals to digital numbers through the $1^{st}$ A/D converter (125) and the $2^{nd}$ A/D converter (126).

When the digital numbers by the two signals are reduced through the subtractor, the value when the pressure is made, becomes smaller than the values in the normal situation, and the reduced value becomes larger than the normal numbers when the reverser (128) goes through the reverser (128).

At that time, by moving the value that is always even number until the reverser it makes the gab of the minimum measured value as 1, and obtain the expected results, and the effectiveness of it is as same as above.

FIG. 15 is a brief circuit diagram showing a different example using this invention, a pressure-sensitive displacement sensor and it is a brief circuit diagram that distinguishes disconnection and push down contact by the electric power flowing on the semi-conductive matrix layer.

The electric current driver (134) is connected to the $1^{st}$ conductive layer (131). The switch is connected to the electric driver (134) to make the electric driver (134) work, and the terminal (−) is connected to the $2^{nd}$ conductive layer (132), and electric voltage-pressure converter that changes the electric voltage to the change of pressure is connected.

And the $1^{st}$ voltage comparison machine (137) that the terminal (−) is connected to the electric current-voltage converter is connected, and the voltage comparison machine that the terminal (+) is connected to electric current-voltage converter is connected and provided.

This pressure-sensitive displacement sensor closes the switch (135) to make the electric current driver (134) ID, and makes Irx electric flow through the L that connects the electric current driver, the resistance Rx of semi-conductive matrix layer (133) and L2 that connects the $2^{nd}$ conductive layer (132) and the electric current-voltage converter (136).

As an example, when the output of the electric current-voltage converter (136) is made as ½Vcc, and Vcp, a point of contact that is connected to the terminal (+) of the $1^{st}$ voltage comparator (137), if resistance Rx of semi-conductive matrix layer (133) is pressed and the resistance value of Rx becomes small, Irx, explained above, becomes larger, and through the electric current-voltage converter (136) Irx, electric current is changed to the voltage Viv, and the value becomes smaller than ¼Vcc.

Therefore, the value that is smaller than ¼ Vcc is input to the terminal (−) in the low part of the $1^{st}$ voltage comparator (137), and Vcp, the input value is ¼Vcc has bigger value, the input of the $1^{st}$-voltage comparator (137) becomes high, and we can sense that semi-conductive matrix layer (133) is pressed.

On the other side, when the value of Vop, a point of contact that is connected to the terminal (−) of the $2^{nd}$ voltage comparator (138) is decided as ¾Vcc, if L1 or L2 is disconnected, both L and are disconnected, electric current Ir reaches to 0, 1 L2 2 and electric current Ir becomes voltage Viv through the electric current-voltage converter (136).

The changed voltage value becomes ¾ Vcc, and the value is input to the terminal (+) in the high part of the $2^{nd}$ voltage comparator (138).

Thus, the value of the voltage of terminal (+) becomes larger than the voltage value of Vop of the $2^{nd}$ voltage comparator (138) that has value of ¾ Vcc, the output of the $2^{nd}$ voltage comparator (138) becomes high, and we can sense the disconnection of L or L or both L and L.

It means that we can sense the disconnection of L or L or push down contact by the electric current amount that flows at the semi-conductive matrix layer (133), and the effectiveness of it is as same as mentioned above.

FIG. 16 is a brief circuit diagram showing another example using this invention, pressure-sensitive displacement sensor, and by removing a noise, we can eliminate the errors and distinguish the disconnection.

The 1st voltage follower (148) that the terminal (+) is connected to the resistor (145) is provided, and the $2^{nd}$ voltage follower (149) that the terminal (+) is connected to the $2^{nd}$ resistor is provided.

In the $1^{st}$ voltage follower (148) and the $2^{nd}$ voltage follower (149), the differential amplifier (150) that the output of the $1^{st}$ voltage follower (148) and the $2^{nd}$ voltage follower (149) is provided.

And, the $1^{st}$ voltage comparator (151) that the terminal (−) of the differential amplifier (150) that is connected to the $1^{st}$ voltage comparator (151) is provided, and the $2^{nd}$ voltage comparator (152) that the terminal (+) is connected to the differential amplifier (150).

In the pressure-sensitive displacement sensor, a noise that is input to the electric circuit through the 1st resistor (145) R, L, Rx, L, and 2nd resistor (147) R and a noise that is input to the electric circuit of the 1st voltage follower (148) and the $2^{nd}$ voltage follower (149) are removed through the differential amplifier (150), and when we assume the profits of the differential amplifier as n the output of the differential amplifier (150) becomes Vdfa=n(Vf−Vf), and we obtain the signal by the displacement of Rx.

As one example, when R:Rx:R=1:2:1 is decided and the value of Vcp, a point of contact that is connected to the terminal (+) of the 1st voltage comparator (151) is decided, the value of the 1st voltage follower (148) of the normal condition, and the value of the 2nd voltage follower (149) is ¼ Vcc, and if the voltage profit is 1 the output value of the differential amplifier (150), Vdfa becomes ½ Vcc.

Thus, the output of the differential amplifier (150) has bigger than ⅓ Vcc, the value of Vcp, the output of the $1^{st}$ voltage comparator (151) becomes low.

In this condition, if Rx by the pressure of semi-conductive matrix layer (144) that has anti-electric conduction is reduced, and becomes R:Rx:R=2:1:2, the value of the 1st voltage follower (140) is ⅗ Vcc, the value of the $2^{nd}$ voltage follower (149) is ⅖ Vcc, and the output of the differential amplifier (150) Vdfa becomes ⅕ Vcc.

Thus, because the value of the differential amplifier (15) Vdfa has smaller value than ⅓Vcc, the output of the $1^{st}$ voltage follower (151) becomes high, and we can sense the pressure of the semi-conductive matrix layer (144).

In the value of Vop, a point of contact that is connected to the terminal (−) of the $2^{nd}$ voltage follower (152) is decided as ⅔ Vcc, when L or L is disconnected, or both L and L are disconnected, Vfli that is input to the $1^{st}$ comparison machine becomes Vcc, and Vf i that is input to the $2^{nd}$ voltage comparator (152) reaches at 0.

Thus, the output of the $1^{st}$ voltage follower (148) Vf becomes Vcc, the output of the $2^{nd}$ voltage follower (149) Vf becomes 0 and the output of Vdfa has larger value of Vop, the output of the $2^{nd}$ voltage comparator (152) becomes high, and we can sense the disconnection of L or L or both L and L.

FIG. 17 is a brief circuit diagram showing another example using pressure-sensitive displacement sensor, and the main circuit and sub-circuit are provided, a noise is removed, and the characteristics of hysteresis is applied in the established condition of push down contact, the disconnection is distinguished.

The switch (165) is provided, the electric current handler that a part is connected to the switch (165), and it is connected to the $1^{st}$ conductive layer (161) of the sensor (160) by connection line L.

And by connection line L, the 1st electric current-voltage converter (166) is provided, the $1^{st}$ phase turner (168) is connected to a part of the $1^{st}$ electric current-voltage converter (166), the $1^{st}$ phase turner (168) is connected to the differential amplifier (173), the push detector (174) is connected and provided to a part of the differential amplifier (173), a part is connected to output part of the push detector (174) at the push detector (174), and resistance Rh is that is connected to the terminal (+) of the push detector (174).

And, by the connection line L, the $2^{nd}$ electric current-voltage converter (167) that is connected through the resistance Rx that is as same as the resistance Rx of normal condition is provided, the $2^{nd}$ phase turner (169) is connected to a part of the $2^{nd}$ electric current-voltage converter (167), and the output part of the 2nd phase turner (169) is connected to the differential amplifier (173).

Between the $1^{st}$ phase turner (168) and the differential amplifier (173), the $1^{st}$ disconnection distinguisher (171) that is connected to the terminal (−), and between the $2^{nd}$ phase turner (169) and the amplifier (173), the $2^{nd}$ disconnection distinguisher (172) that the terminal (−) is connected.

In this connected electric circuit, the output voltage Vdfa of the differential amplifier (173) has 0 in normal time, and when the sensor (160) becomes push down contact, the value of Rx becomes smaller and when Ir becomes increased, the gap of the output voltage Vmain and Vsub of the 1st phase turner (168) becomes larger, the output voltage Vdfa of the differential amplifier (173) is increased.

As an example, if the value of Vcp is set as ⅓ Vcc, the output voltage Vdfa of the differential amplifier (173) becomes increased and the value of Vdfa becomes bigger than ⅓ Vcc, the output of the push detector (174) becomes high and it senses push down contact.

After it becomes to have the characteristics of histerisis because it is around track to Vdfa by Rhis.

But, if the Irx by disconnection of L becomes 0 the output voltage Vmain of the $1^{st}$ phase turner becomes minimum.

If Vop, the disconnection distinguish voltage of the $1^{st}$ disconnection distinguisher (171) is decided as smaller than the minimum of Vmain, the output of the $1^{st}$ disconnection distinguisher (171) becomes high and the disconnection of L is sensed.

And if Ir becomes 0 by disconnection of L, Vsub becomes minimum.

If Vop, the disconnection distinguish voltage of the $2^{nd}$ disconnection distinguisher (172) is decided as smaller than the minimum of Vsub, the output of the $2^n$ disconnection distinguisher (172) becomes high and the disconnection of L is sensed.

FIG. 18 or FIG. 22 is a squint showing other examples using this invention, the pressure-sensitive displacement sensor, and it differentiates the shapes of sensor.

As can be seen from the FIG. 18, the $1^{st}$ semi-conductive matrix layer (181) and the $2^{nd}$ semi-conductive matrix layer (182) are provided, and between the $1^{st}$ semi-conductive matrix layer (181) and the 2$^{nd}$ semi-conductive matrix layer (182), electric conduction layer is provided, many horizontal conductive elements (R) are provided in the upper part of the 1st semi-conductive matrix layer (181), in order to establish many vertical conductive elements (C), the shapes and structure of sensor (180) can be different, and it can be installed and used on the touch screen or keyboard.

As can be seen from FIG. 19, the 1$^{st}$ semi-conductive matrix layer (191) and the 2$^{nd}$ semi-conductive matrix layer (192) are provided, the 1$^{st}$ conduction layer (193) is provided in the bottom of the 1$^{st}$ semi-conductive matrix layer (191), the 2$^{nd}$ conductive layer (192) is provided in the bottom part of the 2$^{nd}$ semi-conductive matrix layer (192), many horizontal conductive elements (R) are provided in the upper part of the 1$^{st}$ semi-conductive matrix layer, many vertical conductive elements (C) are provided in the upper part of the 2$^{nd}$ semi-conductive matrix layer (192), and the shapes and structors of the sensor (190) can be different to establish the insulated layer (195) between the 1$^{st}$ conductive layer (193) and the 2$^{nd}$ semi-conductive matrix layer (194), and the effectiveness is as same as explained above.

As can be seen from FIG. 20 (201, the whole shape of the sensor (200) is provided in a pillar or cylindrical shape, the 1$^{st}$ semi-conductive matrix layer (201) and the 2$^{nd}$ semi-conductive matrix layer (202) are provided, the 1$^{st}$ conductive layer whose shape looks like a disc is provided in the upper part of the 1$^{st}$ semi-conductive matrix layer (201), the 2$^{nd}$ conductive layer (204) whose shape looks like a taret in the bottom part of the 1$^{st}$ semi-conductive matrix layer (201), the 3$^{rd}$ conductive layer (205) whose shape looks like a target in the upper part of the 2$^{nd}$ semi-conductive matrix layer (202), the 4$^{th}$ conductive layer (206) whose shape looks like a disc in the bottom part of the 2$^{nd}$ semi-conductive matrix layer (202), and in order to make insulation layer (207) between the 2$^{nd}$ conductive layer (204) and the 3$^{rd}$ conductive layer (205) the shape and structure of the sensor (200) can be different, and it can be used as a target board at the gun field or archery field.

As can be seen from FIG. 21, the whole shape of the sensor (210) is provided as a pillar shape, the 1$^{st}$ conductive layer (211) and the 2$^{nd}$ conductive layer (212) whose shape looks like a target board, the shape and structure of the sensor (210) can be different in order to make semi-conductive matrix layer (213) between the 1$^{st}$ conductive layer (211) and the 2$^{nd}$ conductive layer (212), and the effectiveness is as same as explained above.

As can be seen from FIG. 22, the whole shape of the sensor (220) is provided to have a pillar shape, the 1$^{st}$ semi-conductive matrix layer (221) and the 2$^{nd}$ semi-conductive matrix layer (222) are provided, the 1$^{st}$ conductive layer (223) whose shape looks like a target board in the upper part of the 1$^{st}$ semi-conductive matrix layer (221), the 2$^{nd}$ conductive layer (224) whose shape looks like a target board in the bottom part of the 2$^{nd}$ semi-conductive matrix layer (222), and the shape and structure of the sensor (220) can be different in order to make the 3$^{rd}$ conductive layer (225) between the 1$^{st}$ semi-conductive matrix layer (221) and the 2$^{nd}$ semi-conductive matrix layer (222).

In another example using this invention, a main circuit and a sub-circuit can be provided to remove a noise that is input from outside, and it can be designed to extract the level of change of the conduction rate caused by pure push down contact.

What is claimed is:

1. A pressure-sensitive displacement sensor comprising:
a contact portion, which includes:
a semi-conductive matrix layer containing conductive materials with a predetermined density, wherein the semi-conductive matrix layer is formed with a soft material having elasticity and has a resistance (Rx) under a normal condition without subjecting to a contact pressure, and when the semi-conductive layer is pressed, a density of the conductive materials in the semi-conductive matrix layer is increased due to compression of the soft semi-conductive layer, which results in reduction of the resistance (Rx);
a first conductive layer containing conductive materials and disposed on a first surface of the semi-conductive matrix layer; and
a second conductive layer containing conductive materials and disposed on a second surface of the semi-conductive matrix layer opposing to the first surface;
a first resistor having one side connected to the first conductive layer and the other side connected to a power source;
a second resistor having one side connected to the second conductive layer and the other side connected to ground;
a first voltage comparator having a plus terminal and a minus terminal, the minus terminal connected to the first conductive layer;
a second voltage comparator having a plus terminal and a minus terminal, the plus terminal connected to the second conductive layer;
a third resistor having one side connected to the power source and the other side connected to the plus terminal of the first voltage comparator;
a fourth resistor having one side connected to the plus terminal of the first voltage comparator and the other side connected to the minus terminal of the second voltage comparator;
a fifth resistor having one side connected to ground and the other side connected to the minus terminal of the second voltage comparator; and
an OR-gate connected to the outputs of the first and second voltage comparators and operable to output signals in response to the outputs of the first and second voltage comparators to detect the compression of the soft semi-conductive layer of the contact portion.

2. The displacement sensor according to claim 1, further comprising a disconnection check resistor having one side connected to the minus terminal of the first voltage comparator and the other side connected to the plus terminal of the second voltage comparator.

3. The displacement sensor according to claim 1, further comprising:
a third voltage comparator having a plus terminal and a minus terminal, the plus terminal connected to the first resistor;
a fourth voltage comparator having a plus terminal and a minus terminal, the minus terminal connected to the second resistor;
a sixth resistor having one side connected to the power source and the other side connected to the minus terminal of the third voltage comparator;
a seventh resistor having one side connected to the minus terminal of the third voltage comparator and the other side connected to the plus terminal of the fourth voltage comparator;
an eighth resistor having one side connected to ground and the other side connected to the plus terminal of the fourth voltage comparator; and
a second OR-gate connected to the outputs of the third and fourth voltage comparators.

* * * * *